(12) United States Patent
Zhang et al.

(10) Patent No.: US 10,383,000 B2
(45) Date of Patent: *Aug. 13, 2019

(54) COORDINATED RAN AND TRANSPORT NETWORK UTILIZATION

(71) Applicant: T-Mobile USA, Inc., Bellevue, WA (US)

(72) Inventors: Hongliang Zhang, Sammamish, WA (US); Hailei Henry Cheng, Chicago, IL (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,174

(22) Filed: Jan. 22, 2018

(65) Prior Publication Data

US 2018/0206148 A1 Jul. 19, 2018

Related U.S. Application Data

(63) Continuation of application No. 14/919,583, filed on Oct. 21, 2015, now Pat. No. 9,877,227.

(51) Int. Cl.
*H04W 28/02* (2009.01)
*H04L 12/801* (2013.01)
(Continued)

(52) U.S. Cl.
CPC ......... *H04W 28/0289* (2013.01); *H04L 47/11* (2013.01); *H04L 47/14* (2013.01); *H04W 24/04* (2013.01); *H04W 24/08* (2013.01)

(58) Field of Classification Search
None
See application file for complete search history.

(56) References Cited

U.S. PATENT DOCUMENTS

2009/0059895 A1 3/2009 Yasrebi et al.
2009/0252049 A1 10/2009 Ludwig et al.
(Continued)

FOREIGN PATENT DOCUMENTS

| EP | 2731375 | 5/2014 |
|----|---------|--------|
| WO | WO2007126352 | 11/2007 |
| WO | WO2014110410 | 7/2014 |

OTHER PUBLICATIONS

Office action for U.S. Appl. No. 14/919,583, dated Dec. 15, 2016, Zhang et al., "Coordinated RAN and Transport Network Utilization", 13 pages.
(Continued)

*Primary Examiner* — Bob A Phunkulh
(74) *Attorney, Agent, or Firm* — Lee & Hayes, P.C.

(57) ABSTRACT

OSS device(s) described herein are configured to receive a congestion indication from a RAT component, a CSR, or an edge router of a core network and to determine whether the congestion indication meets a threshold or criteria. Based on that determination, the OSS device(s) may perform one or both of obtaining additional transport resources from a provider of a transport network or updating a resource utilization policy for the RAT component, CSR, or edge router. If obtaining additional transport resources, the OSS device(s) may notify the RAT component, the CSR, and the edge router. If updating a policy, the OSS device(s) may provide the updated resource utilization policy to its associated RAT component, CSR, or edge router.

20 Claims, 5 Drawing Sheets

(51) Int. Cl.
*H04W 24/08* (2009.01)
*H04W 24/04* (2009.01)

(56) References Cited

U.S. PATENT DOCUMENTS

| | | |
|---|---|---|
| 2010/0182903 A1 | 7/2010 | Palanki et al. |
| 2013/0077575 A1 | 3/2013 | Vadlamudi |
| 2013/0124719 A1 | 5/2013 | Espinosa |
| 2014/0022904 A1 | 1/2014 | Ahmad et al. |
| 2014/0233389 A1* | 8/2014 | Bantukul ............ H04L 47/127 370/236 |
| 2014/0369206 A1 | 12/2014 | Karlsson et al. |
| 2014/0379872 A1 | 12/2014 | Eisl et al. |
| 2015/0029854 A1 | 1/2015 | Starsinic et al. |
| 2015/0036496 A1 | 2/2015 | Shan et al. |
| 2015/0117197 A1 | 4/2015 | Radulescu et al. |
| 2015/0117204 A1 | 4/2015 | Lott et al. |
| 2015/0181459 A1 | 6/2015 | Zhu |
| 2016/0029246 A1 | 1/2016 | Mishra et al. |
| 2016/0066192 A1 | 3/2016 | Markwart et al. |
| 2016/0135077 A1 | 5/2016 | Streijl |
| 2016/0157114 A1 | 6/2016 | Kalderen et al. |
| 2016/0277961 A1 | 9/2016 | Hedman et al. |
| 2016/0337525 A1 | 11/2016 | Da Silva et al. |
| 2017/0019908 A1 | 1/2017 | Lou et al. |
| 2017/0118126 A1* | 4/2017 | Stjernholm ....... H04W 28/0268 |
| 2017/0118672 A1 | 4/2017 | Zhang et al. |

OTHER PUBLICATIONS

Office action for U.S. Appl. No. 14/919,583, dated Jul. 13, 2017, IZhang et al, "Coordinated RAN and Transport Network Utilization", 16 pages.

PCT Search Report and Written Opinion dated Jan. 26, 2017 for PCT Application No. PCT/US16/57709, 9 pages.

The Extended European Search Report dated Mar. 19, 2019 for European Patent Application No. 16858134.6, a counterpart of U.S. Pat. No. 9,877,227, 11 pages.

Ericsson, "Existing closed-loop congestion control mechanisms and their relation to UPCON", retrieved on Apr. 2, 2013 at <<http://www.3gpp.org/ftp/tsg_sa/WG2_Arch/TSGS2_96_San_Diego/Docs/ >>, 3rd Generation Partnership Project (3GPP), vol. SA WG2, France.

* cited by examiner

US 10,383,000 B2

COORDINATED RAN AND TRANSPORT NETWORK UTILIZATION

CROSS-REFERENCE TO RELATED APPLICATION

This application is a continuation of, and claims priority to, U.S. application Ser. No. 14/919,583, now known as U.S. Pat. No. 9,877,227, entitled "COORDINATED RAN AND TRANSPORT NETWORK UTILIZATION", filed on Oct. 21, 2015, the entirety of which is incorporated herein by reference.

BACKGROUND

Congestion increasingly impacts telecommunication service. Despite improvements in radio access technology (RAT), demand for services and increasing use of specific services, such as video streaming, often results in poor user experience. To mitigate congestion, operators of telecommunication networks implement quality of service (QoS) control at both the air interface and the backhaul/transport. At the air interface, a scheduler or other RAT component may utilize QoS traffic classes in allocating resource blocks of radio frequency (RF) spectrum. At the backhaul/transport, cell site routers (CSR) of cell sites and a mobile switch office (MSO) of the core network of the telecommunication network operator, which serve as edge routers for the transport network, may also utilize QoS traffic classes in allocating resources of that transport network. However, operators to not coordinate the resource allocation and congestion monitoring at the air interface and backhaul/transport. As a result, resources may not be fully utilized.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
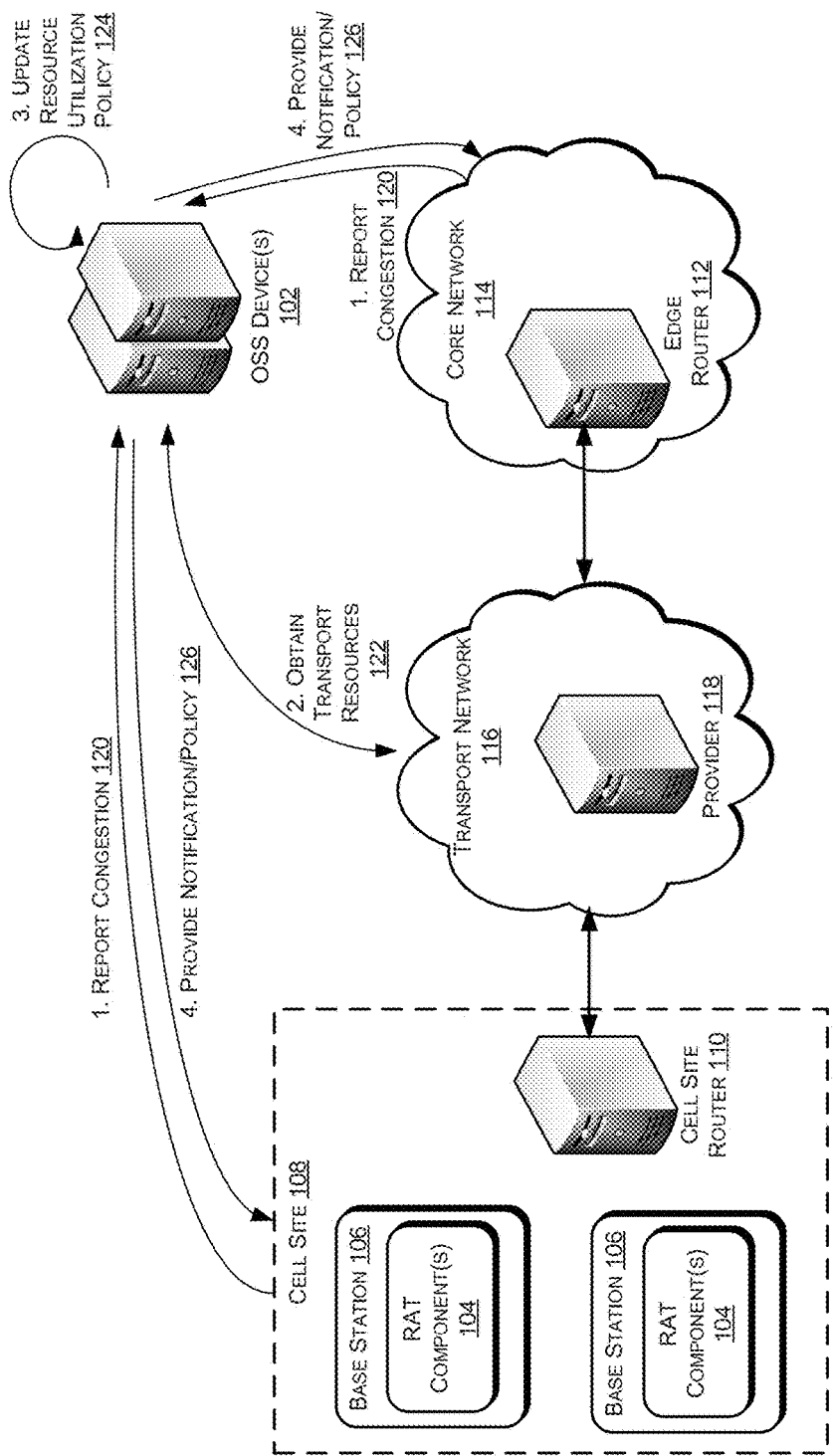
FIG. 1 illustrates an overview and example environment, including a RAT component, a CSR, an edge router, and operations support system (OSS) device(s), the OSS device(s) coordinating resource utilization among the RAT component, CSR, and edge router.

This disclosure describes, in part, OSS device(s) configured to receive a congestion indication from a RAT component, a CSR, or an edge router of a core network and to determine whether the congestion indication meets a threshold or criteria. Based on that determination, the OSS device(s) may perform one or both of obtaining additional transport resources from a provider of a transport network or updating a resource utilization policy for the RAT component, CSR, or edge router. If obtaining additional transport resources, the OSS device(s) may notify the RAT component, the CSR, and the edge router of the additional transport resources. If updating a policy, the OSS device(s) may provide the updated resource utilization policy to its associated RAT component, CSR, or edge router. In some implementations, updating a resource utilization policy may be performed if additional transport resources could not be obtained or if a threshold or criteria for requesting such resources is not met. In further implementations, the congestion indication may be received from one of the RAT component or the CSR/edge router(s) and the resource utilization policy may be updated for the other of the RAT component or the CSR/edge router(s).

In one example, a 3G RAT of a base station may be experiencing downlink congestion due to limited radio resources or bad radio propagation environments. An edge router responsible for downlink to that base station, however, may be unaware of the congestion and may still allocation a large amount of transport network resources to 3G. In this situation, the 3G RAT is struggling to deliver more traffic over airlink to user devices and expects less downlink traffic coming from transport network. Accordingly, a bottleneck may exist over the airlink even if RAT components for the 3G RAT adjust resource allocations for the traffic classes, relieving the air interface congestion. To address this potential bottleneck, OSS device(s) may receive a congestion indication for the RAT components and may update a resource utilization policy for the edge router to shrink resources or lower traffic priority to 3G. Once an action has been taken, the edge router may be notified and adjusts its resource utilization accordingly.

In another example, a 3G RAT of a base station may be experiencing uplink congestion due to a small amount of transport network resources allocated the 3G or better radio propagation environments. In this situation, the 3G RAT is struggling to deliver more traffic over transport to the core network and expects a large amount of transport network resources for uplink. Accordingly, a bottleneck may exist over the uplink transport. To address this potential bottleneck, OSS device(s) may receive a congestion indication for the RAT components and may either obtain additional transport resources or update a resource utilization policy for the CSR to provide greater resources to 3G. Once either or both actions have been taken, the CSR may be notified and adjust its resource utilization accordingly.

Overview

FIG. 1 illustrates an overview and example environment, including a RAT component, a CSR, an edge router, and OSS device(s), the OSS device(s) coordinating resource utilization among the RAT component, CSR, and edge router. As illustrated, OSS device(s) 102 may be connected to RAT components 104 of base stations 106 of a cell site 108. The OSS device(s) 102 may also be connected to a CSR 110 of the cell site 108 and to an edge router 112 of a core network 114. The CSR 110 and edge router 112 may be connected via a transport network 116. Further, the OSS device(s) 102 may connect to a provider 118 of the transport network 116 via an interface. In various implementations, the OSS device(s) 102 may receive at 120 congestion indicia from any or all of the RAT components 104, the CSR 110, or the edge router 112. The OSS device(s) 102 may then obtain at 122 additional transport resources from the provider 118, update at 124 a resource utilization policy, or perform both 122 and 124. The OSS device(s) 102 may then provide notification of the additional transport resources or the updated policy to any or all of the RAT components 104, the CSR 110, or the edge router 112.

Figure 2:
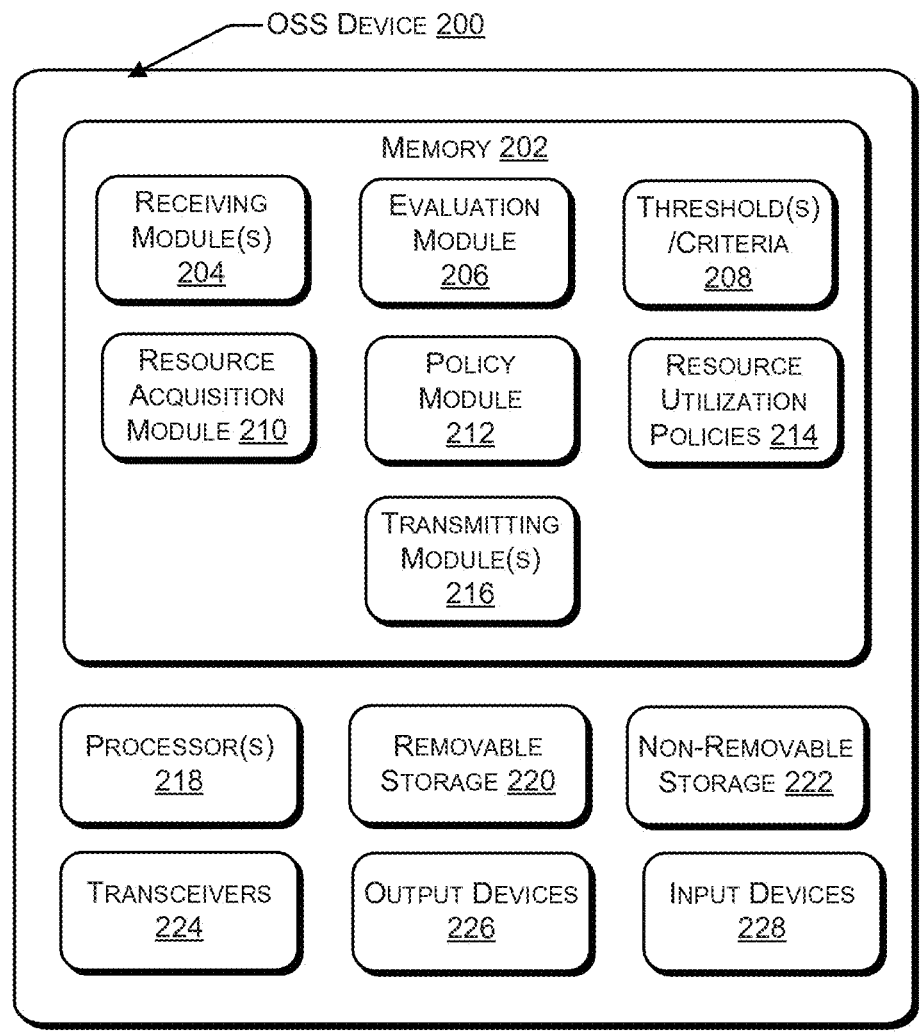
FIG. 2 illustrates a component level view of an OSS device configured to receive congestion indicia, obtain additional transport resources, update resource utilization policies, and provide notification of the resources or the updated policy.

In various implementations, each of the OSS device(s) 102, base stations 106, CSR 110, edge router 112, and provider 118 may be or include one or more computing devices. Such computing devices may each be or include a server or server farm, multiple, distributed server farms, a mainframe, a work station, a personal computer (PC), a laptop computer, a tablet computer, an embedded system, or any other sort of device or devices. In one implementation, ones of such computing devices represent a plurality of computing devices working in communication, such as a cloud computing network of nodes. An example OSS device 102 is illustrated in FIG. 2 and is described in detail below with reference to that figure.

The OSS device(s) 102 may implement an OSS of a telecommunication network operator and may be responsible for monitoring, managing, and maintaining computing devices of the telecommunication network of that telecommunication network operator. For instance, the OSS device(s) 102 may monitor, manage, and maintain devices of cell sites, such as cell site 108, which may include base stations, such as base stations 106, and CSR, such as CSR 110. The OSS device(s) may also monitor, manage, and maintain devices of the core network 114 of the telecommunication network operator, such as edge router 112.

In some implementations, each cell site, such as cell site 108, may include one or more base stations, such as base stations 106, associated with a geographic area. Such base stations 106 may be implemented on one or more cell towers and may each be associated with one or more RATs. The base stations 106 may include, for instance, an eNode B associated with LTE RAT, a Node B associated with Fourth Generation (4G) or Third Generation (3G) RATs (e.g., Universal Mobile Telecommunications System (UMTS) or Global System for Mobility (GSM) RATs), or other sorts of base stations, such as base stations associated with Second Generation (2G) RATs.

Each base station 106 may utilize a range or ranges of licensed or unlicensed frequency spectrum, and may include one or more RAT components 104, such as schedulers or buffers, to manage utilization of that frequency spectrum. Such RAT components 104 may implement resource utilization policies which prioritize certain traffic classes for use of the frequency spectrum. Traffic classes may in turn be associated with services (e.g., voice calling, Voice over LTE (VoLTE), video calling, messaging, data, etc.) or with categories of users (e.g., subscribers of different operators, subscribers with different levels of subscription plans, etc.). The base stations 106 and their RAT components 104 may be configured to monitor congestion over the air interface (e.g., frequency spectrum) and to adjust resource allocation based on that monitoring and on the resource utilization policy. If a priority traffic class is not congested and a lower priority traffic class is congested, the RAT components 104 may allocate more resources to the lower priority traffic class.

In some implementations, the multiple base stations 106 of a cell site 108 may share a CSR 110, with one CSR 110 for each cell site 108. In other implementations, a cell site 108 may have multiple CSR. The CSR 110 may send and receive traffic from the base stations 106 and the core network 114 and may be connected to the core network 114 by a transport network 116. In such implementations, the CSR 110 is an edge router between the cell site 108 and transport network 116. The CSR 110 may implement buffers for different base stations 106, different RATs, different services, different user categories, or other different traffic classes. The CSR 110 may also give priorities to each buffer for transmitting traffic over the transport network 116 to the core network 114 (referred to as "uplink" traffic). Such priorities may also be governed by resource utilization policies and by monitoring of buffer statuses in light of available transport network resources. If there is more traffic to transmit than resources available, higher priority traffic will be transmitted first by the CSR 110.

In addition to cell sites, such as cell site 108, the telecommunication network of the telecommunication network operator may include a core network 114. Such a core network 114 may include a number of network components providing connectivity between cell sites of the telecommunication network, between cell sites of the telecommunication network and those of other telecommunication networks, and between cell sites and devices of other networks. The core network 114 may support packet-switched communications, circuit-switched communications, or both. Further, the core network 114 may be a System Architecture Evolution (SAE) core network or a UMTS core network, or may include network components from both. Also, the core network 114 may include an Internet Protocol (IP) Multimedia subsystem (IMS) layer for supporting packet-switched communications.

In various implementations, the edge router 112 of the core network 114 may provide connectivity between the core network 114 and the transport network 116. The edge router may be, for instance, a mobile switch office (MSO) connected to multiple CSRs of multiple cell sites over the transport network 116. Such an edge router 112 may include buffers for different cell sites 108, base stations 106, different RATs, different services, different user categories, or other different traffic classes. The edge router 112 may also give priorities to each buffer for transmitting traffic over the transport network 116 to the cell sites, such as cell site 108 (referred to as "downlink" traffic). Such priorities may also be governed by resource utilization policies and by monitoring of buffer statuses in light of available transport network resources. If there is more traffic to transmit than resources available, higher priority traffic will be transmitted first by the edge router 112.

In some implementations, the transport network 116 may comprised leased Ethernet lines and router computing devices connecting those lines. Both the Ethernet lines and the routers may belong to a provider 118, which may sell or lease the Ethernet lines or may guaranty a certain amount of bandwidth for transmitting traffic across the transport network 116. Such lines or bandwidth may constitute transport resources. The provider 118, which may include one or more management computing devices or servers, may include an interface enabling customers, such as telecommunication network operators, to acquire additional transport resources.

In various implementations, the OSS device(s) may be configured to receive at 120 congestion indicia from the RAT components 104, from the CSR 110, and from the edge router 112. The congestion indicia may be provided in an event driven fashion, when congestion detected at the RAT components 104, the CSR 110, or the edge router 112 exceeds a threshold, on a periodic basis, or both. The congestion indicia may be provided in an unsolicited manner or in response to a request from the OSS device(s). Also, the congestion indicia may comprise metrics of packet loss, buffer fullness, QoS, spectral efficiency, a number of concurrent users, a data rate, call drops, or any other measure which may indicate congestion of the air interface or transport network.

Upon receiving a congestion indication, the OSS device(s) 102 may determine whether the congestion indication meets a threshold or criteria. Such a determination may involve comparing the metrics forming the congestion indication to the threshold or criteria. In some implementations, the threshold or criteria may comprise multiple thresholds or sets of criteria associated with different actions. For example, a higher threshold or set of criteria may be associated with obtaining additional transport resources and a lower threshold or set of criteria may be associated with updating a resource utilization policy. If neither is met, the OSS device(s) 102 may take no action. Also, if the OSS device(s) 102 receive a congestion indication from one of the RAT components 104, CSR 110, or edge router 112, the OSS device(s) 102 may obtain a congestion status from the others and may utilize those statuses along with the congestion indication in determining whether the threshold or criteria are met.

Based on the determination of whether the threshold or criteria are met, the OSS device(s) 102 may seek to obtain at 122 additional transport resources from the provider 118. In some implementation, the quantity or type of additional transport resources sought may vary with the magnitude of the congestion associated with the congestion indication. The OSS device(s) 102 may request the additional transport resources through an interface with the provider 118, and the provider 118 may grant the request, deny it, or provide only a part of the requested transport resources.

In various implementations, also based on the determination of whether the threshold or criteria are met, the OSS device(s) 102 may update, at 124, resource utilization policies for at least one of the RAT components 104, CSR 110, or edge router 112. The OSS device(s) 102 may also perform such an update at 124 responsive to a denial of a request for additional transport resources, responsive to the granting of only a part of the requested additional transport resources, or simply in addition to a grant of additional transport resources. Such an update may comprise adjusting resource allocations between congested traffic classes and uncongested traffic classes or between congested RATs and uncongested RATs. As noted above, such traffic classes may be associated with services or categories of users.

In some implementations, the OSS device(s) 102 may then provide at 126 the updated resource utilization policies, notifications of additional transport resources, or both to at least one of the RAT components 104, the CSR 110, or the edge router 112. In one example, the congestion indication may have been received from the RAT components 104. In such an example, notifications of additional transport resources may be provided to all of the RAT components 104, the CSR 110, and the edge router 112, or resource utilization policies may be updated for one or both of the CSR 110 and edge router 112 and may be provided to that one or both of the CSR 110 and edge router 112. A resource utilization policy provided to the CSR 110 may be an uplink policy and a resource utilization policy provided to the edge router 112 may be a downlink policy.

In various implementations, when receiving a notification of additional transport resources, the RAT components 104, CSR 110, or edge router 112 may update their own resource utilization policies or behaviors based on the additional transport resources. When receiving an updated resource utilization policy, the RAT components 104, CSR 110, or edge router 112 may replace or modify its resource utilization policy with the updated resource utilization policy.

Example Device

FIG. 2 illustrates a component level view of an OSS device configured to receive congestion indicia, obtain additional transport resources, update resource utilization policies, and provide notification of the resources or the updated policy. As illustrated, the OSS device 200 comprises a system memory 202 storing receiving module(s) 204, an evaluation module 206, threshold(s)/criteria 208, a resource acquisition module 210, a policy module 212, resource utilization policies 214, and transmitting module(s) 216. Also, the OSS device 200 includes processor(s) 218, a removable storage 220, a non-removable storage 222, transceivers 224, output device(s) 226, and input device(s) 228.

In various implementations, system memory 202 is volatile (such as RAM), non-volatile (such as ROM, flash memory, etc.) or some combination of the two. The receiving module(s) 204 may include a first receiving module for receiving congestion indicia from RAT components and a second receiving module for receiving congestion indicia from CSR or edge routers, as described above with respect to FIG. 1. The evaluation module 206 may determine whether the received congestion indicia meet thresholds or criteria 208, as described above with respect to FIG. 1. The resource acquisition module 210 may obtain additional transport resources from a provider of a transport network, as described above with respect to FIG. 1. The policy module 212 may update resource utilization policies 214 for RAT components, CSR, or edge router, as described above with respect to FIG. 1. The transmitting module(s) 216 may include a first transmitting module for transmitting notifications or policy updates to RAT components and a second transmitting module for transmitting notifications or policy updates to CSR or edge routers, as described above with respect to FIG. 1. Algorithm(s) implemented by the modules 204, 206, 210, 212, and 216 is/are illustrated by the flowcharts shown in FIGS. 3-5.

In some implementations, the processor(s) 218 is a central processing unit (CPU), a graphics processing unit (GPU), or both CPU and GPU, or any other sort of processing unit.

The OSS device 200 may also include additional data storage devices (removable and/or non-removable) such as, for example, magnetic disks, optical disks, or tape. Such additional storage is illustrated in FIG. 2 by removable storage 220 and non-removable storage 222.

Non-transitory computer-readable media may include volatile and nonvolatile, removable and non-removable tangible, physical media implemented in technology for storage of information, such as computer readable instructions, data structures, program modules, or other data. System memory 202, removable storage 220 and non-removable storage 222 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the OSS device 200. Any such non-transitory computer-readable media may be part of the OSS device 200.

In some implementations, the transceivers 224 include any sort of transceivers known in the art. For example, the transceivers 224 may include wired communication components, such as an Ethernet port, for communicating with other networked devices. Also or instead, the transceivers 224 may include wireless modem(s) to may facilitate wireless connectivity with other computing devices. Further, the transceivers 224 may include a radio transceiver that performs the function of transmitting and receiving radio frequency communications via an antenna.

In some implementations, the output devices 226 include any sort of output devices known in the art, such as a display (e.g., a liquid crystal display), speakers, a vibrating mechanism, or a tactile feedback mechanism. Output devices 226 also include ports for one or more peripheral devices, such as headphones, peripheral speakers, or a peripheral display.

In various implementations, input devices 228 include any sort of input devices known in the art. For example, input devices 228 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

Figure 3:
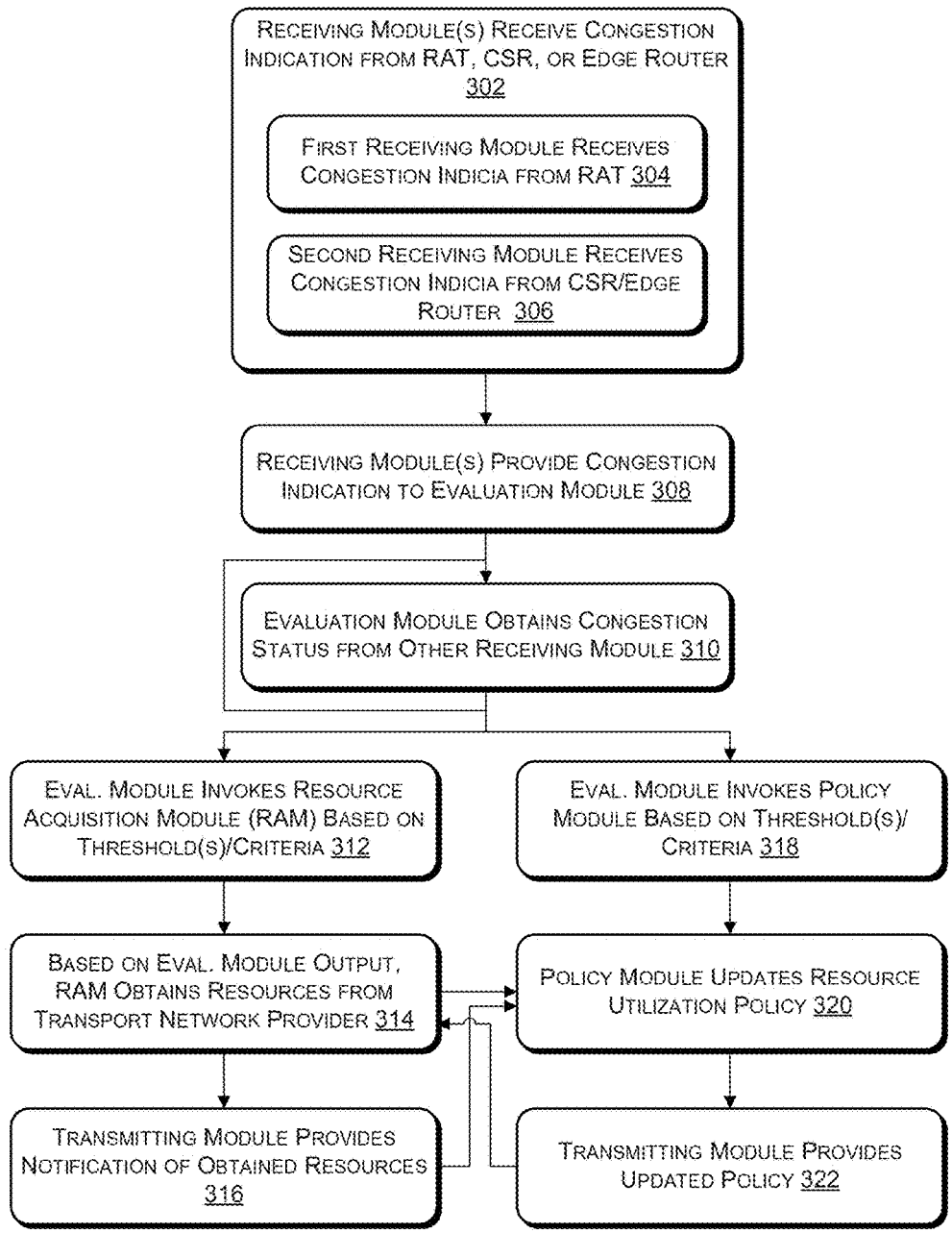
FIG. 3 illustrates an example process for receiving congestion indicia, determining whether the indicia meet a threshold or criteria, obtaining additional transport resources, updating resource utilization policies, and providing notification of the resources or the updated policy.
Figure 4:
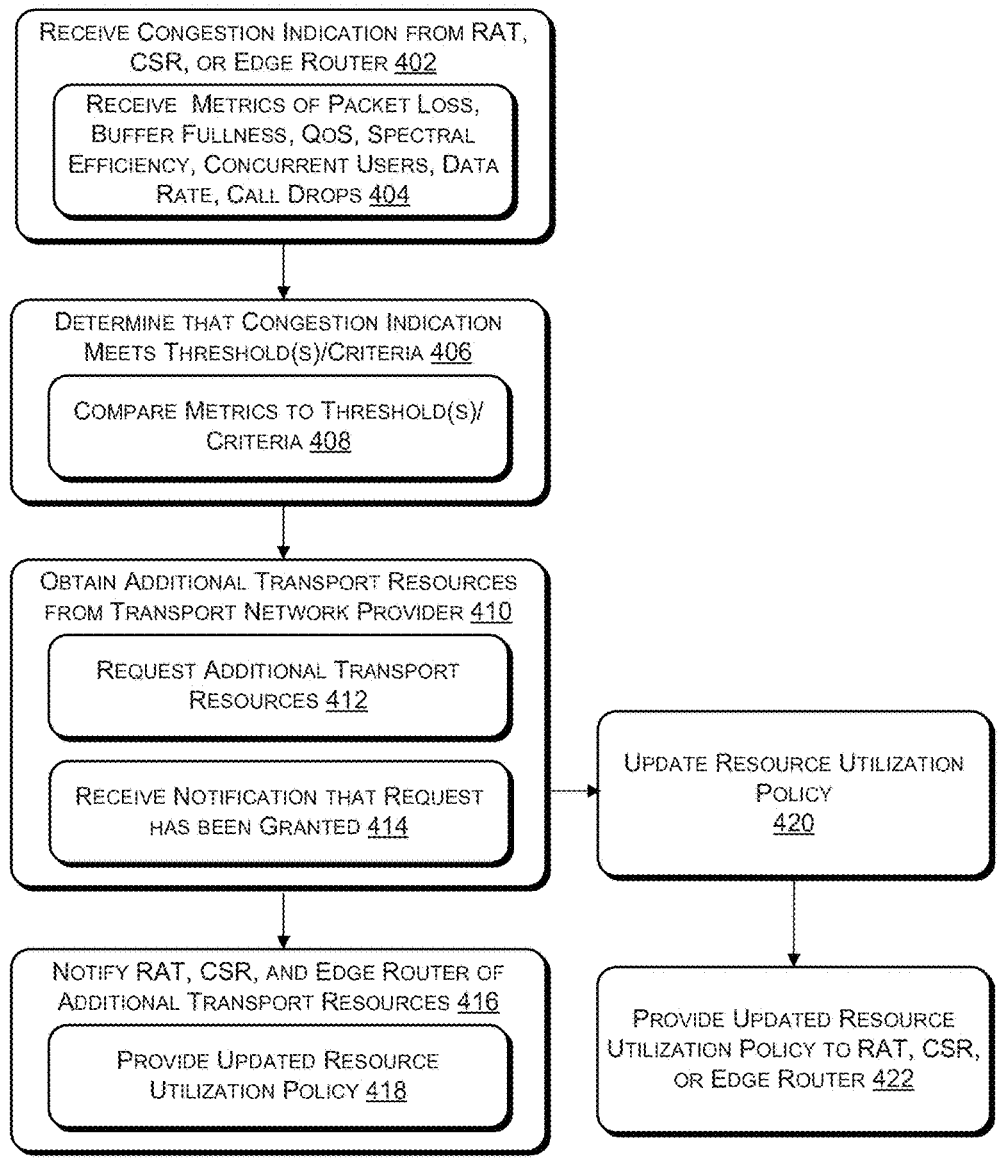
FIG. 4 illustrates an example process for receiving congestion indicia, determining whether the indicia meet a threshold or criteria, obtaining additional transport resources, and providing notification of the resources.
Figure 5:
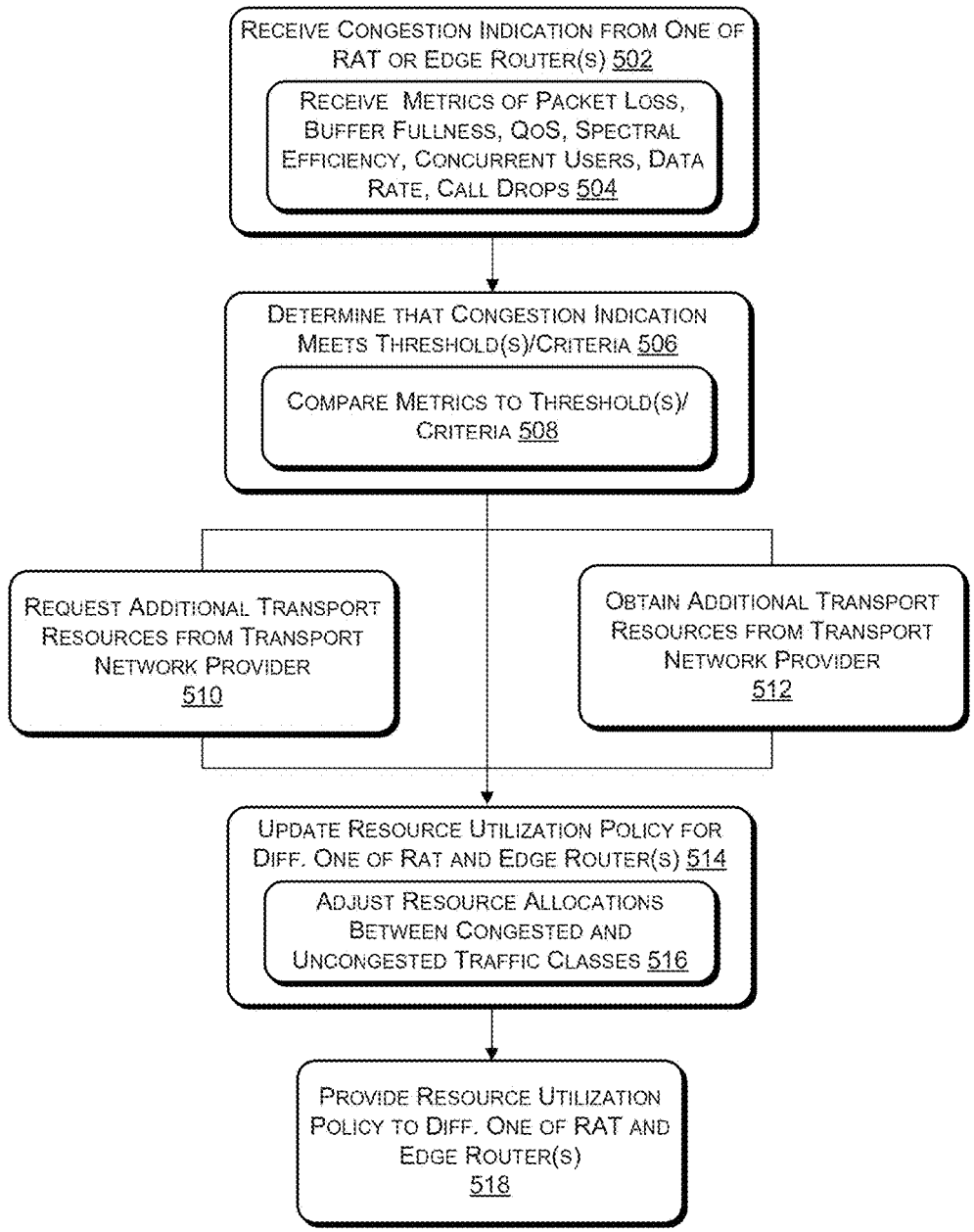
FIG. 5 illustrates an example process for receiving congestion indicia from one of a RAT component or edge router(s), determining whether the indicia meet a threshold or criteria, updating a resource utilization policy for a different one of the RAT component or the edge router(s), and providing the updated policy to the different one of the RAT component or the edge router(s).

FIGS. 3-5 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 illustrates an example process for receiving congestion indicia, determining whether the indicia meet a threshold or criteria, obtaining additional transport resources, updating resource utilization policies, and providing notification of the resources or the updated policy. The process includes, at 302, receiving, by receiving module(s) of an OSS device, a congestion indication from a RAT component of a cell site of a telecommunication service provider, a CSR of the cell site, or an edge router of a core network of the telecommunication service provider. In some implementations, the receiving module(s) may comprise a first receiving module for receiving, at 304, congestion indicia from RAT components and a second receiving module for, at 306 receiving congestion indicia from CSRs and edge routers.

At 308, the receiving module(s) may provide the congestion indication to an evaluation module of the OSS device.

At 310, the evaluation module, responsive to obtaining the congestion indication from one of the first and second receiving modules, may obtain a congestion status from the other of the first and second receiving modules.

At 312, the evaluation module determine that the congestion indication meet a first threshold or criteria and, in response, invokes a resource acquisition module of the OSS device(s).

At 314, the resource acquisition module obtains additional transport resources from a provider of a transport network connecting the cell site to the core network.

At 316, a transmitting module of the OSS device(s) may provide notification of the additional transport resources to the RAT component, the CSR, and the edge router.

At 318, instead of determining at 312 that the first threshold or criteria has been met, the evaluation module may determine that the first threshold or criteria has not been met, but that a second threshold or criteria has been met. Based on this determining, the evaluation module, at 318, invokes a policy module of the OSS device(s).

At 320, the policy module updated a resource utilization policy for at least one of the RAT component, the CSR, or the edge router. The policy module may be invoked to perform such an update by the evaluation module, based on thresholds or criteria, by the resource acquisition module responsive to a denial of a request for additional transport resources, or by a transmitting module following or concurrently with transmission of a notification of additional transport resources.

At 322, a transmitting module of the OSS device(s) may provide the resource utilization policy to the at least one of the RAT component, the CSR, or the edge router. The transmitting module may then, in some implementations, invoke the resource acquisition module.

FIG. 4 illustrates an example process for receiving congestion indicia, determining whether the indicia meet a threshold or criteria, obtaining additional transport resources, and providing notification of the resources. The process includes, at 402, receiving, by OSS device(s), a congestion indication from a RAT component of a cell site of the telecommunication service provider, a CSR of the cell site, or an edge router of a core network of the telecommunication service provider. At 404, receiving the congestion indication comprises receiving metrics of packet loss, buffer fullness, QoS, spectral efficiency, a number of concurrent users, a data rate, or call drops. The RAT component may be one of a scheduler or buffer associated with Long Term Evolution (LTE), Fourth Generation (4G), Third Generation (3G), or Second Generation (2G) network technology implemented by a base station, Node B, or eNode B of the cell site. The edge router may be a MSO connected to multiple CSRs over the transport network.

At 406, the OSS device(s) may determine that the congestion indication meets a threshold or criteria. At 408, the determining may include comparing the metrics to the threshold or criteria. In various implementations, the threshold or criteria comprises multiple thresholds or sets of criteria, each threshold or set of criteria associated with a different request for additional transport resources or a different update to a resource utilization policy.

At 410, based on the determining at 406, the OSS device(s) may obtain additional transport resources from a provider of a transport network connecting the cell site to the core network. The obtaining may include requesting, at 412, the additional transport resources and receiving, at 414, notification that the request has been granted. In some implementations, the requesting at 412 of the additional transport resources and the receiving at 414 notification that the request has been granted comprise requesting at 412 and receiving at 414 over an interface between the OSS device (s) and the provider of the transport network.

At 416, the OSS device(s) may then notify the RAT component, the CSR, and the MSO of the additional transport resources. At 418, the notifying may comprise providing at least one of the RAT component, the CSR, or the edge router with an updated resource utilization policy.

At 420, the OSS device(s) may also or instead update a resource utilization policy based on one or both of the congestion indication and the additional transport resources. At 422, the OSS device(s) may then provide the updated resource utilization policy to at least one of the RAT component, the CSR, or the edge router.

In various implementations, the receiving at 402 comprises receiving the congestion indication from the RAT component and the notifying at 416 comprises providing an updated resource utilization policy for one or both of the CSR and the edge router.

FIG. 5 illustrates an example process for receiving congestion indicia from one of a RAT component or edge router(s), determining whether the indicia meet a threshold or criteria, updating a resource utilization policy for a different one of the RAT component or the edge router(s), and providing the updated policy to the different one of the RAT component or the edge router(s). The process includes, at 502, OSS device(s) receiving a congestion indication from one of a RAT component of a cell site of the telecommunication service provider or edge router(s) connecting the cell site to a core network of the telecommunication service provider over a transport network. The edge router(s) may include a CSR of the cell site and a MSO connected to multiple cell site routers over the transport network. At 504, receiving the congestion indication may include receiving metrics of packet loss, buffer fullness, QoS, spectral efficiency, a number of concurrent users, a data rate, or call drops.

At 506, the OSS device(s) may determine that the congestion indication meets a threshold or criteria. At 508, the determining includes comparing the metrics to the threshold or criteria. In some implementations, the threshold or criteria may comprise multiple thresholds or sets of criteria, each threshold or set of criteria associated with a different request for additional transport resources or a different update to a resource utilization policy.

At 510, based on the determining, the OSS device(s) may request additional transport resources from a provider of the transport network, and the request may be denied. At 512, the OSS device(s) may obtain the additional transport resources responsive to a grant of a request for those resources.

At 514, the OSS device(s) may update a resource utilization policy for a different one of the RAT component or the edge router(s). The updating at 514 may be based on the determining at 506. Additionally, the updating at 514 may be based on a denial of the request at 510 or on the obtaining of the additional transport resources at 512. At 516, the updating comprises adjusting resource allocations between congested traffic classes and uncongested traffic classes or between congested RATs and uncongested RATs. In various implementations, the congested traffic classes and the uncongested traffic classes may be associated with categories of service or categories of users. In further implementations, the resource utilization policy may be either an uplink policy for the CSR or a downlink policy for the MSO.

At 518, the OSS device(s) may provide the resource utilization policy to the different one of the RAT component or the edge router(s).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An operations support system (OSS) device comprising:
   a processor;
   one or more transceivers in data communication with a cell site operated by a telecommunication service provider, a core network operated by the telecommunication service provider, and an interface of an intermediate transport network that connects the cell site to the core network, wherein the intermediate transport network is operated by a provider different than the telecommunication service provider; and
   memory storing computer-executable instructions that, when executed by the processor, perform operations comprising:
      receiving a congestion indication from the cell site or the core network;
      determining that the congestion indication is above a first threshold;
      in response to determining that the congestion indication is above the first threshold, generating a resource utilization policy for resources of the intermediate transport network that are available to the telecommunication service provider; and
      sending the resource utilization policy to the cell site or the core network.

2. The OSS device of claim 1, wherein the operations further comprise:
   determining that the congestion indication is above a second threshold, the second threshold being higher than the first threshold; and
   in response to determining that the congestion indication is above the second threshold, sending a request for additional resources of the intermediate transport network to the provider.

3. The OSS device of claim 2, further comprising:
   obtaining the additional resources of the intermediate transport network in response to the request,
   wherein the resource utilization policy indicates how to prioritize traffic sent by the cell site or the core network over resources of the intermediate transport network that are available to the telecommunication service provider, including the additional resources.

4. The OSS device of claim 2, further comprising:
   receiving a denial of the request for the additional resources from the provider,
   wherein the resource utilization policy indicates how to prioritize traffic sent by the cell site or the core network over resources of the intermediate transport network that were previously available to the telecommunication service provider prior to sending the request.

5. The OSS device of claim 1, wherein the congestion indication is received from a radio access technology component of a base station of the cell site.

6. The OSS device of claim 1, wherein the congestion indication is received from a cell site router of the cell site that connects the cell site to the intermediate transport network.

7. The OSS device of claim 6, wherein the resource utilization policy is an uplink policy sent to the cell site router.

8. The OSS device of claim 1, wherein the congestion indication is received from an edge router of the core network that connects the core network to the intermediate transport network.

9. The OSS device of claim 8, wherein the resource utilization policy is a downlink policy sent to the edge router.

10. The OSS device of claim 1, wherein the congestion indication comprises metrics of packet loss, buffer fullness, quality of service, spectral efficiency, a number of concurrent users, a data rate, or call drops.

11. A method, comprising:
receiving, by an operations support system (OSS) device in data communication with a with a cell site operated by a telecommunication service provider, a core network operated by the telecommunication service provider, and an interface of an intermediate transport network that connects the cell site to the core network, a congestion indication from the cell site or the core network;
determining, by the OSS device, that the congestion indication is above a first threshold;
in response to determining that the congestion indication is above the first threshold, generating, by the OSS device, a resource utilization policy for resources of the intermediate transport network that are available to the telecommunication service provider; and
sending, by the OSS device, the resource utilization policy to the cell site or the core network,
wherein the intermediate transport network is operated by a provider different than the telecommunication service provider.

12. The method of claim 11, further comprising:
determining, by the OSS device, that the congestion indication is above a second threshold, the second threshold being higher than the first threshold; and
in response to determining that the congestion indication is above the second threshold, sending, by the OSS device, a request for additional resources of the intermediate transport network to the provider.

13. The method of claim 12, further comprising:
obtaining, by the OSS device, the additional resources of the intermediate transport network in response to the request,
wherein the resource utilization policy indicates how to prioritize traffic sent by the cell site or the core network over resources of the intermediate transport network that are available to the telecommunication service provider, including the additional resources.

14. The method of claim 12, further comprising:
receiving, by the OSS device, a denial of the request for the additional resources from the provider,
wherein the resource utilization policy indicates how to prioritize traffic sent by the cell site or the core network over resources of the intermediate transport network that were previously available to the telecommunication service provider prior to sending the request.

15. The method of claim 11, wherein the congestion indication is received from a radio access technology component of a base station of the cell site, or a cell site router of the cell site that connects the cell site to the intermediate transport network.

16. The method of claim 11, wherein the congestion indication is received from an edge router of the core network that connects the core network to the intermediate transport network.

17. One or more non-transitory computer-readable media storing computer-executable instructions that, when executed by one or more processors of an operations support system (OSS) device in data communication with a cell site operated by a telecommunication service provider, a core network operated by the telecommunication service provider, and an interface of an intermediate transport network that connects the cell site to the core network, cause the one or more processors to perform operations comprising:
receiving a congestion indication from the cell site or the core network;
determining that the congestion indication is above a first threshold;
in response to determining that the congestion indication is above the first threshold, generating a resource utilization policy for resources of the intermediate transport network that are available to the telecommunication service provider; and
sending the resource utilization policy to the cell site or the core network,
wherein the intermediate transport network is operated by a provider different than the telecommunication service provider.

18. The computer-readable media of claim 17, wherein the operations further comprise:
determining that the congestion indication is above a second threshold, the second threshold being higher than the first threshold; and
in response to determining that the congestion indication is above the second threshold, sending a request for additional resources of the intermediate transport network to the provider.

19. The computer-readable media of claim 18, wherein the operations further comprise:
obtaining the additional resources of the intermediate transport network in response to the request,
wherein the resource utilization policy indicates how to prioritize traffic sent by the cell site or the core network over resources of the intermediate transport network that are available to the telecommunication service provider, including the additional resources.

20. The computer-readable media of claim 18, wherein the operations further comprise:
receiving a denial of the request for the additional resources from the provider,
wherein the resource utilization policy indicates how to prioritize traffic sent by the cell site or the core network over resources of the intermediate transport network that were previously available to the telecommunication service provider prior to sending the request.

* * * * *